US012305883B2

United States Patent
Ng et al.

(10) Patent No.: US 12,305,883 B2
(45) Date of Patent: May 20, 2025

(54) COMBINED DIRECT AND INDIRECT EVAPORATIVE COOLING SYSTEM AND METHOD

(71) Applicant: KING ABDULLAH UNIVERSITY OF SCIENCE AND TECHNOLOGY, Thuwal (SA)

(72) Inventors: Kim Choon Ng, Thuwal (SA); Muhammad Wakil Shahzad, Rahim Yar Khan (PK); Muhammad Burhan, Lahore (PK); Doskhan Ybyraiymkul, Almaty (KZ); Seung Jin Oh, Jeju-si (KR)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 863 days.

(21) Appl. No.: 17/273,535

(22) PCT Filed: Jul. 29, 2019

(86) PCT No.: PCT/IB2019/056454
§ 371 (c)(1),
(2) Date: Mar. 4, 2021

(87) PCT Pub. No.: WO2020/058778
PCT Pub. Date: Mar. 26, 2020

(65) Prior Publication Data
US 2021/0341157 A1   Nov. 4, 2021

Related U.S. Application Data

(60) Provisional application No. 62/772,208, filed on Nov. 28, 2018, provisional application No. 62/740,572, (Continued)

(51) Int. Cl.
F24F 5/00 (2006.01)
F24F 6/04 (2006.01)
F28C 1/14 (2006.01)

(52) U.S. Cl.
CPC .............. *F24F 5/0035* (2013.01); *F24F 6/04* (2013.01); *F28C 1/14* (2013.01)

(58) Field of Classification Search
CPC ... F24F 5/0035; F24F 6/04; F28C 1/14; F28C 3/08; Y02B 30/54; Y02B 30/70; F28B 5/00; F28D 5/02
See application file for complete search history.

(56) References Cited

U.S. PATENT DOCUMENTS

2002/0038552 A1   4/2002   Maisotsenko et al.
2007/0101746 A1   5/2007   Schlom et al.
(Continued)

OTHER PUBLICATIONS

International Search Report in corresponding/related International Application No. PCT/IB2019/056454, date of mailing Nov. 25, 2019.

(Continued)

*Primary Examiner* — Nelson J Nieves
*Assistant Examiner* — Matthew John Moscola
(74) *Attorney, Agent, or Firm* — PATENT PORTFOLIO BUILDERS PLLC

(57) ABSTRACT

A cooling system for cooling an enclosure, the cooling system including a heat exchange section configured to transfer sensible heat; a humidifier located outside the heat exchange section and configured to humidify a working air stream C so that it transfers latent heat; an air moving system configured to move various air streams through the cooling system; and a piping system configured to connect the heat exchange section to the humidifier and the air moving system. The sensible heat transfer is decoupled from the latent heat transfer.

27 Claims, 12 Drawing Sheets

Related U.S. Application Data filed on Oct. 3, 2018, provisional application No. 62/733,753, filed on Sep. 20, 2018.

(56) References Cited

U.S. PATENT DOCUMENTS

| | | | | |
|---|---|---|---|---|
| 2007/0289320 | A1* | 12/2007 | Bhatti | ................... F24F 5/0035 |
| | | | | 62/176.6 |
| 2010/0000247 | A1* | 1/2010 | Bhatti | ................... F24F 3/1417 |
| | | | | 62/235.1 |
| 2013/0305752 | A1 | 11/2013 | Martin | |
| 2019/0063761 | A1* | 2/2019 | Jin | ........................... F24F 11/30 |

OTHER PUBLICATIONS

Written Opinion of the International Searching Authority in corresponding/related International Application No. PCT/IB2019/056454, date of mailing Nov. 25, 2019.

Substantive Examination Report in corresponding/related Saudi PCT National Phase Application No. 521421509, issued Jun. 30, 2022.

\* cited by examiner

COMBINED DIRECT AND INDIRECT EVAPORATIVE COOLING SYSTEM AND METHOD

CROSS-REFERENCE TO RELATED APPLICATIONS

This application is a U.S. National Stage Application of International Application No. PCT/IB2019/056454, which claims priority to U.S. Provisional Patent Application No. 62/733,753, filed on Sep. 20, 2018, entitled "A COMBINED DIRECT AND INDIRECT EVAPORATIVE COOLER WITH MULTI INJECTION OF WORKING/PURGED AIR," U.S. Provisional Patent Application No. 62/740,572, filed on Oct. 3, 2018, entitled "A COMBINED DIRECT AND INDIRECT EVAPORATIVE COOLER WITH MULTI INJECTION OF WORKING/PURGED AIR," and U.S. Provisional Patent Application No. 62/772,208, filed on Nov. 28, 2018, entitled "COMBINED DIRECT AND INDIRECT EVAPORATIVE COOLING SYSTEM AND METHOD," the disclosures of which are incorporated herein by reference in their entirety.

BACKGROUND

Technical Field

Embodiments of the subject matter disclosed herein generally relate to a cooling system, and more specifically, to a combined direct and indirect evaporative cooling system.

Discussion of the Background

The conventional electrical air-conditioning systems have been in use for more than a century and they are deemed to be energy inefficient. However, these devices are still widely used for cooling commercial, industrial and residential enclosures due to their relative simplicity and convenience. Over the last few decades, scientists and engineers have attempted to improve the energy efficiency of the major components of the refrigeration cycle as well as the assorted types of environment friendly refrigerants. However, the overall systems' efficiency has reached an asymptotic limit, around $0.85 \pm 0.05$ $kW_{elec}$ per Refrigeration ton (Rton).

As an alternative to the electrical air-conditioning systems, direct and indirect evaporation coolers have been developed. However, these systems are not widely deployed. A typical direct evaporation cooler (DEC) 100 includes, as illustrated in FIG. 1, a housing 102 holding humidification blocks 104 that are sprayed with water, which is pumped by a water pump 106. The water pump 106 takes the water from a water tank 108 and pumps this water along a water distribution system 110 to maintain the humidification blocks 104 wet. The humidification blocks are made of a porous material so that the water can move through the inside of the blocks. A fan 112 draws-in warm and dry ambient air 114 through the wet blocks 104. During this process, the warm ambient air 114 evaporates part of the water dripping through the humidification blocks 104, thus cooling the air. In other words, the latent heat of the air is used to evaporate the water and the evaporation process cools the air while increasing its moisture content or relative humidity (RH). No heat is added or taken out of the air during this process as the water vapors stay with the air inside the housing 102. Thus, this process is an adiabatic process of constant enthalpy.

On the other hand, indirect evaporative cooler devices (IECs) are based on two different air streams that do not directly contact each other, a working stream and a product stream, as schematically illustrated in FIG. 2.

More specifically, FIG. 2 shows an IEC system 200 having two different channels, a dry channel 210 and a wet channel 220. These two channels are separated by hydrophilic membranes 230 supported with hydrophobic sheets. The hydrophilic membranes 230 on the wet channel side are kept moist, for example, with water sprays 240, to provide evaporative cooling to extract heat from dry channel 210. The hydrophobic membrane 230 facing the dry channel side prevents water transferring to the dry side to maintain the humidity of the supply air 212. The outside air is forced with a forced draft fan (not shown) through the dry channel 210 and at the end of dry channel, a portion of the supply air 212 becomes outlet air 214, which is the cooled air that maybe used for various purposes, while a portion is diverted as a working air 222 and passed through the wet channel 220, eventually becoming exhaust air 224, at the other end of the wet channel. While travelling through the wet channel 220, the working air 222 picks-up moisture from the hydrophilic membranes 230 and produces cooling, which extract heat from the dry channel air 212, and helps to drop the supply air 212 temperature. A typical IEC system can achieve an efficiency of about 55%.

There is a desire in the industry to achieve an improvement over the existing energy efficiency of the present day air conditioning or cooling systems, for example, to below a level of 0.5 $kW_{elec}$ per Rton. Despite much progress being made in delivering environment friendly refrigerants for cooling cycles with no ozone destruction potential (ODP) and zero global warming potential (GWP), these working refrigerants are nevertheless chemically-based and yet the massive annual consumption of refrigerants may pose significant energy and environmental penalties during their manufacture. Thus, there is a need for a new cooling system that does not use refrigerants and also has a high efficiency.

SUMMARY

According to an embodiment, there is a cooling system for cooling an enclosure. The cooling system includes a heat exchange section configured to transfer sensible heat, a humidifier located outside the heat exchange section and configured to humidify a working air stream C so that it transfers latent heat, an air moving system configured to move various air streams through the cooling system, and a piping system configured to connect the heat exchange section to the humidifier and the air moving system. The sensible heat transfer is decoupled from the latent heat transfer.

According to another embodiment, there is a method for cooling an enclosure with a cooling system. The method includes absorbing from outside the cooling system an inlet air stream A and circulating the inlet air stream A through a dry channel of a heat exchange section, which is configured to transfer sensible heat from the dry channel to first and second wet channels, cooling the inlet air stream A in the dry channel to obtain a cooled air stream B, removing part of the cooled air stream B as a working air stream C, increasing a humidity of the working air stream C with a humidifier, which is located outside the heat exchange section, to obtain a humid working air stream D, circulating the humid working air stream D through the first and second wet channels to evaporate water droplets and obtain a purged air stream E, and expelling the purged air stream E outside the cooling system.

According to still another embodiment, there is a cooling system for cooling an enclosure, the cooling system including a dry channel configured to perform sensible heat exchange on an inlet air stream A to obtain a cooled air stream B for cooling the enclosure, a first wet channel configured to transfer heat to a humid working air stream D to obtain a purged air stream E, and a humidifier located outside the dry channel and the first wet channel and configured to humidify a working air stream C to obtain the humid working air stream D. The inlet air stream A is taken from outside the enclosure, and the purged air stream E is released outside the enclosure.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a generic cell that includes two wet channels and one dry channel for cooling air. However, the embodiments discussed herein are applicable to other configurations, for example, systems that use more generic cells as per capacity requirement.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a cooling system is presented that is capable of cooling a stream of supply air without any mechanical vapor compressors, chemical-based (chlorofluorocarbons) refrigerants, cooling towers, chilled and cooling water pipes. This novel cooling system eliminates more than 75% of the conventional infrastructure of mechanical or thermally driven chillers. The novel cooling system is called herein the Direct-spray with Indirect Evaporative cooler (DS-IEC) system. Such a system uses only clean water for heat removal and utilizes the evaporative potential of the air. The DS-IEC systems are not only simple in design and operation, they are suited for both residential, commercial, and industrial applications. Such systems achieve a space cooling and humidity level similar to the traditional air-conditioning units, particularly for hot and dry climates of semi-arid and arid regions. The heat extraction in the DS-IEC systems includes the latent heat in a humidifier and the sensible heat flow (orthogonal direction) across the heat exchanger plates (which can be made of aluminum). When the water evaporates in the wet channels, it removes heat from the air flowing in the dry channel, thus lowering the dry-bulb temperature of the inlet air (which is to be supplied for cooling). The desired outlet air stream's temperature is about 18° C.-21° C., depending on the applications. The cooling capacity of such a system varies during the diurnal and nocturnal hours and can be readily controlled by adjusting a proportion of the purged air, from the supply air, needed for the application, as discussed later.

Figure 1:
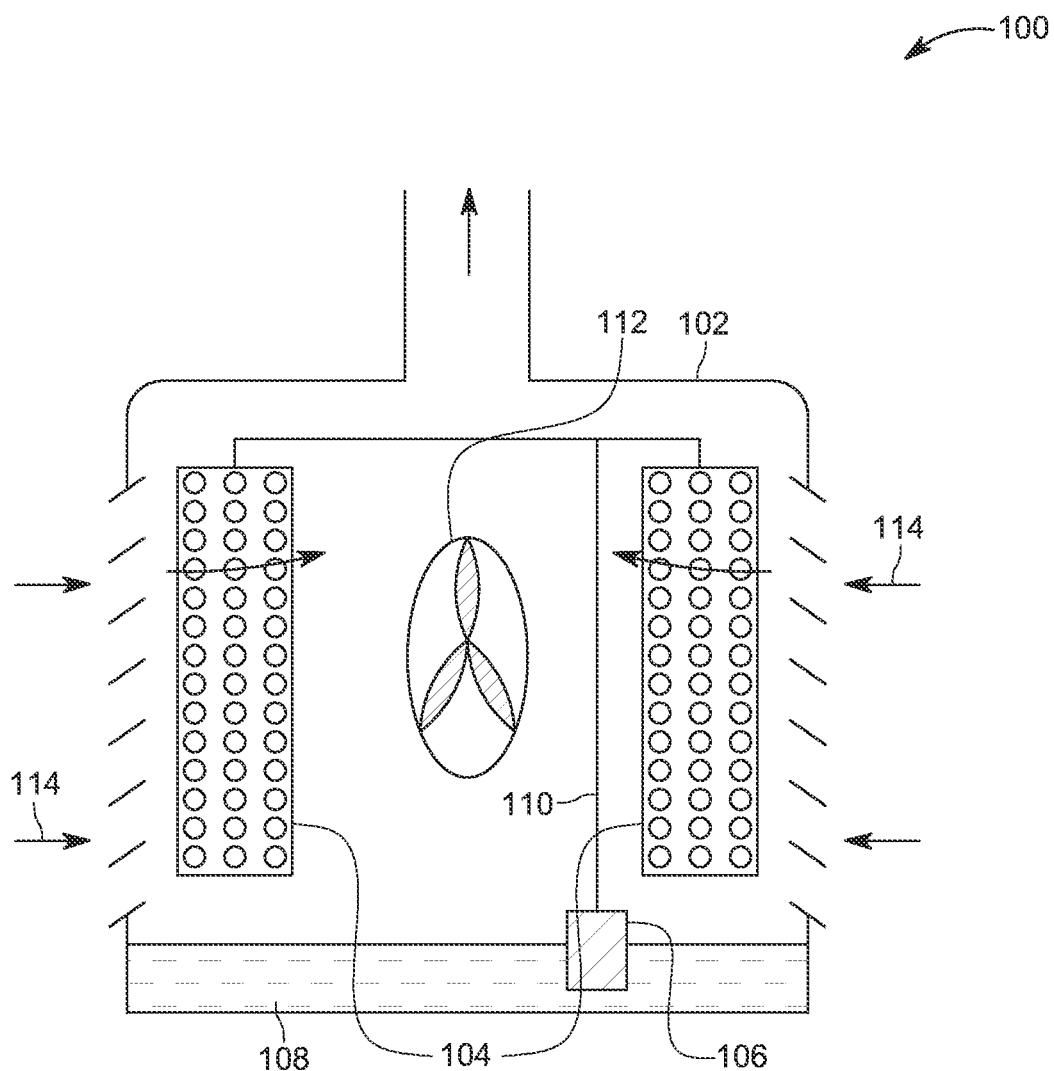
FIG. 1 illustrates a traditional direct evaporative system for cooling air in an enclosure.
Figure 2:
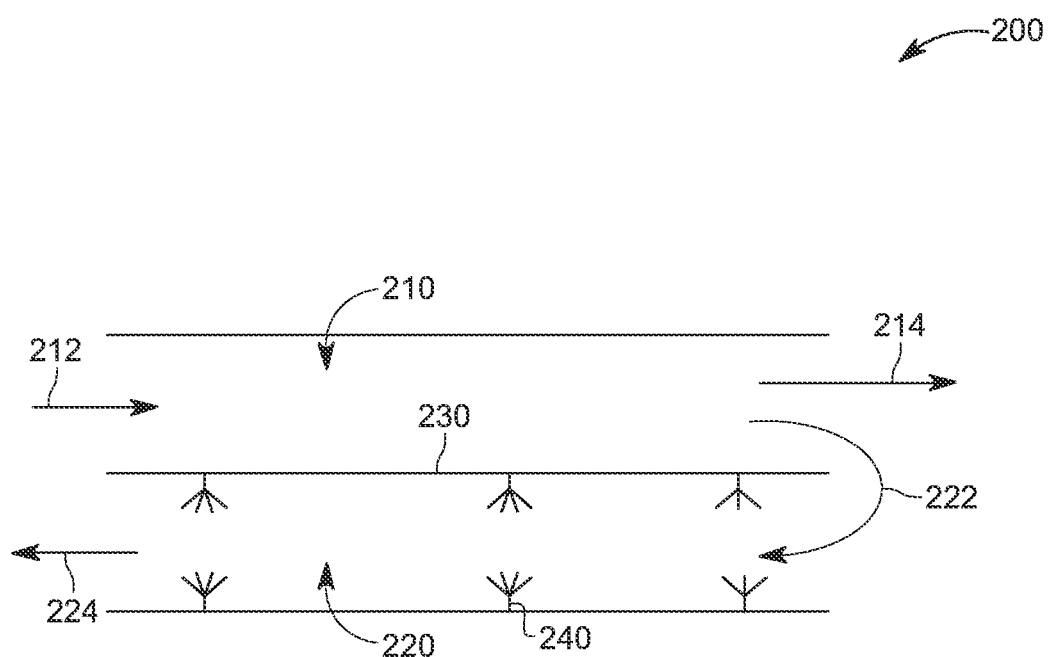
FIG. 2 illustrates a traditional indirect evaporative system for cooling air in an enclosure.
Figure 3:
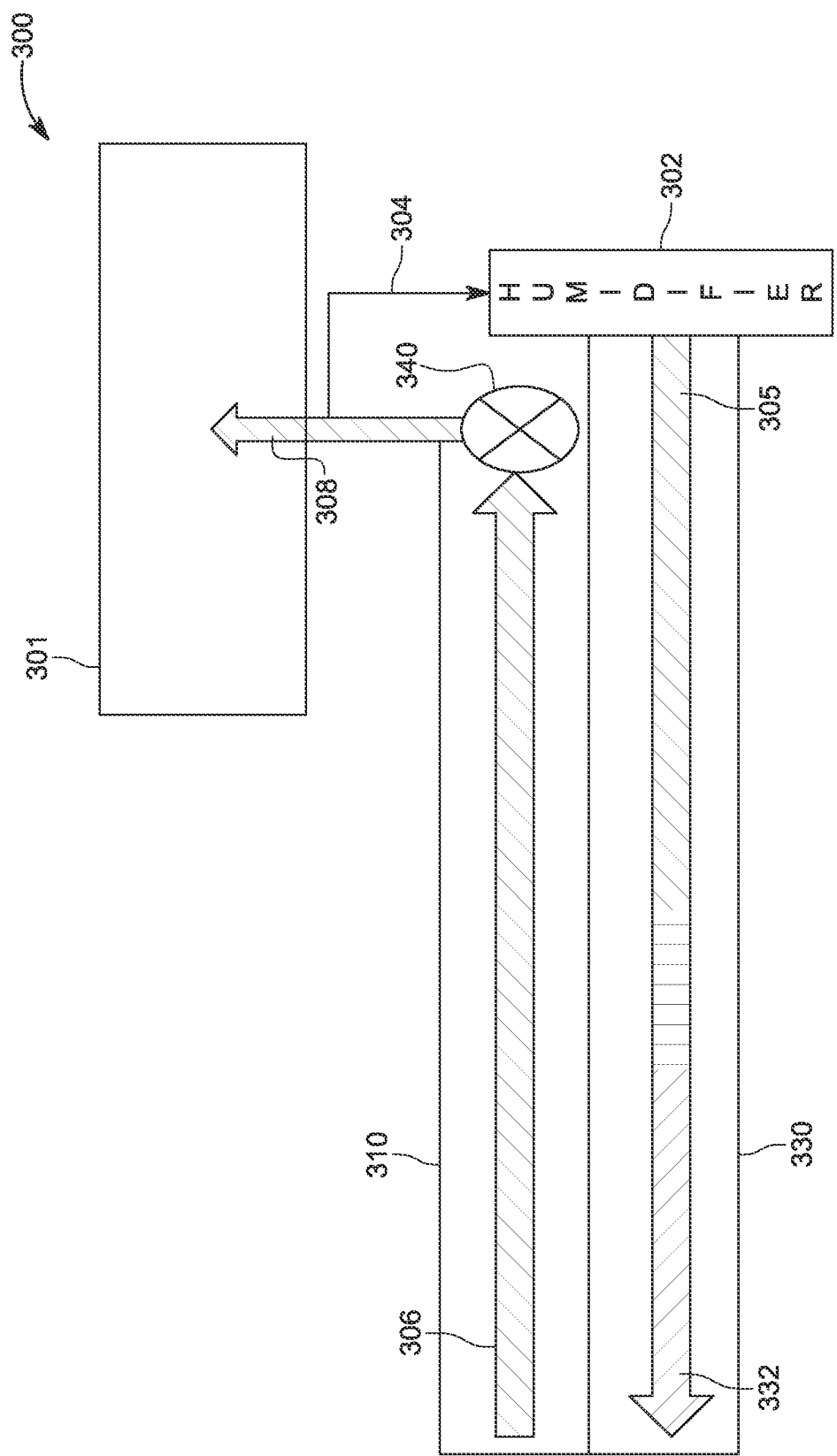
FIG. 3 illustrates a combined direct evaporative-indirect evaporative cooling system.

According to the embodiment illustrated in FIG. 3, the DS-IEC system 300 has a direct water droplets (with droplet diameter less than 1 mm) injection humidifier device 302, causing an incoming working air stream 304 to experience rapid humidification. The working air stream 304 is taken out from the inlet air stream 306, after being cooled due to the heat exchange between the dry channel 310 and the wet channel 330. Note that the induced draft blower 340 pulls the inlet air stream 306 through the dry channel 310. The inlet air stream 306 is taken from outside the enclosure 301 (i.e., from the ambient of the cooling system) to be cooled. The remaining part of the inlet air stream 306, i.e., the supply air stream 308, is discharged into the enclosure 301 for cooling this enclosure. The working air stream 304, after being circulated through the humidifier device 302, becomes a humidified air stream 305, which has a lower temperature then the water droplet due to latent heat removal and is nearly saturated (almost 100% RH or larger than 90% RH) prior to entering the wet channel 330. The large temperature difference (LMTD) across the dry and wet channels 310 and 330 increases the orthogonal heat transfer between these channels, resulting in a further drop in temperature of the supply air stream 308 as it emerges from the dry channel 310. As more heat is transferred into the moist working air stream 304 flowing into the wet channel 330, the local evaporative potential increases correspondingly. Such increase of the evaporative potential along the air flowing through the wet channel will increase the cooling potential of the dry air in the wet channel 330. The outlet air stream 332 exiting the wet channel 330 has a high humidity (nearly 100% RH) as the transformation of the humidified air stream 305 into the outlet air stream 332 involved using latent heat to evaporate the water droplets. The outlet air stream 332 is discharged outside the enclosure 301, as shown in FIG. 3. In other words, the inlet air stream 306, which is taken from outside the enclosure 301 to be cooled, is split into two streams after being cooled in the dry channel 310, a supply air stream 308 and a working air stream 304. The supply air stream 308 is provided to the enclosure for cooling off the enclosure while the working air stream 304 is used to cool the inlet air stream 306. After the working air stream 304 is humidified at humidifier 302, and the water mist evaporates while moving along the wet channel 330, the resultant outlet air stream 332 includes air and water vapors, which are discharge outside the enclosure 301. With this arrangement, different from the existing direct and/or indirect evaporative systems, the indirect evaporative part is decoupled from the direct evaporative part, i.e., the indirect evaporative part includes heat transfer between the dry and wet channels while the direct evaporative part includes the humidifier. In this way, the latent heat removal and the sensible heat removal are decoupled from each other. Because of this novel decoupling of the direct evaporative process (in the humidifier) from the indirect evaporative process (between the dry and wet channels), the present system is considered to be a mixed direct evaporative-indirect evaporative system.

Because of the features noted above, the configuration illustrated in FIG. 3 has a higher performance as compared to conventional M-cycle systems. Although the conventional M-cycle has one dry channel followed by a corresponding wet channel, the flow configuration has an inferior crossflow arrangement between the dry and wet channels, and working under a pressurized condition due to the forced draft blower. In addition, for the conventional systems, the purged air that is being extracted from the outlet section of the dry channel, has the same psychrometric conditions, which diminishes the heat extraction role to the latent effect alone. Such conventional IEC systems have a lower performance (see curves 400 and 402 in FIG. 4, which shows the psychometric chart, with the dry bulb temperature on the X axis, humidity on the Y axis, relative humidity plotted on the Z axis, and the wet bulb temperature plotted on the W axis) due to the diminished evaporative potential at lower air temperature. In other words, an air stream in a conventional M-cycle system moves through a dry channel so that its temperature its decreasing from about 40° C. to about 30° C. (i.e., following curve 400) and then, the working air is used to remove latent heat, which implies that its temperature is increasing to about 35° C. and its humidity slightly increases as indicated by curve 402 in FIG. 4.

Figure 4:
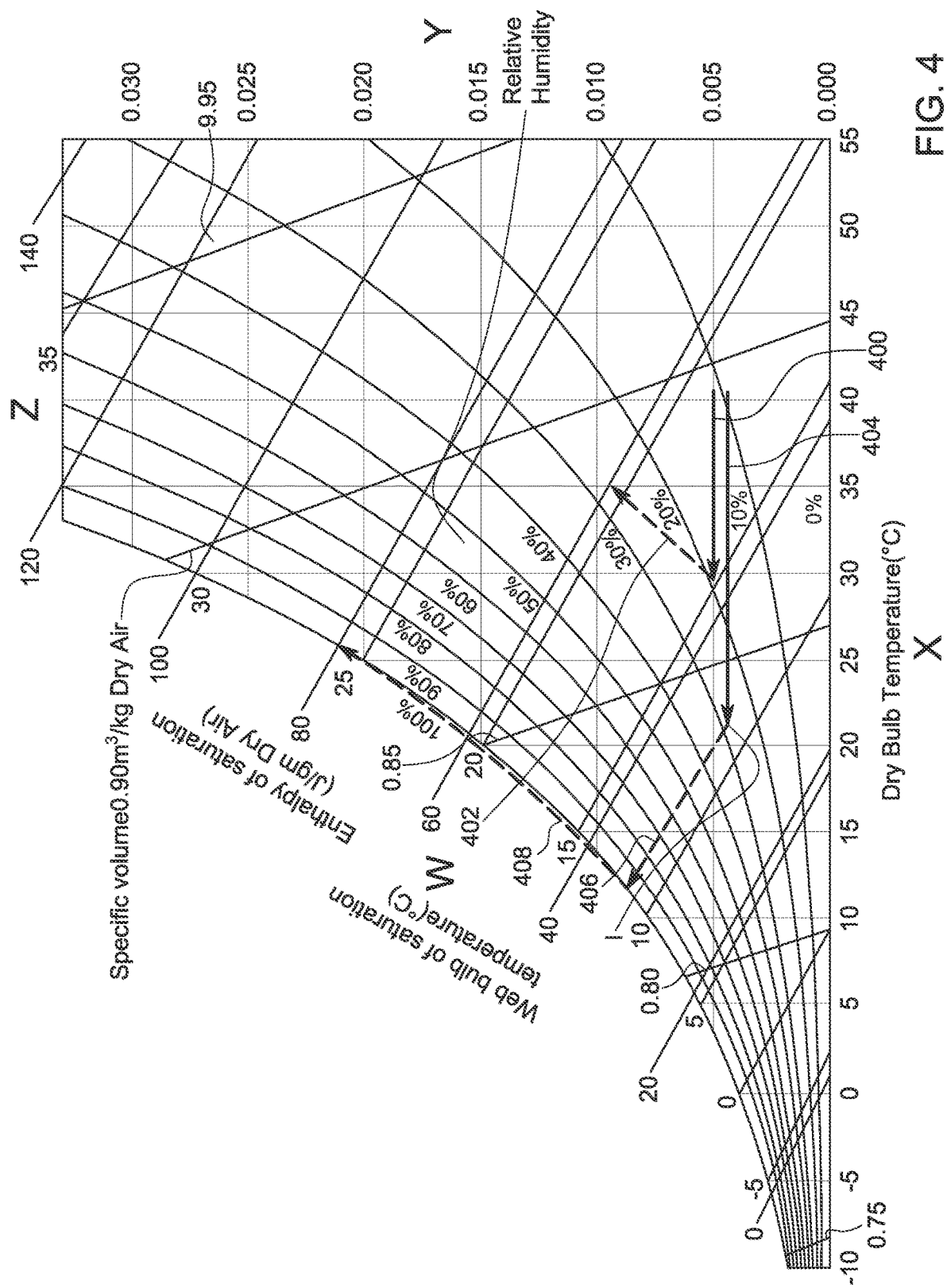
FIG. 4 illustrates the thermodynamic processes associated with the combined direct evaporative-indirect evaporative cooling system.

The processes associated with the system 300 are illustrated by curves 404, 406, and 408 on the psychometric chart of FIG. 4 and they indicate a different approach comparative to the traditional M-cycle system. More specifically, the inlet air stream 306 (see FIG. 3) enters the system 300 (in the embodiment of FIG. 3) at about 40° C. and this air stream is cooled to about 20° C. as illustrated by curve 404. This cooling process takes place inside the dry channel 310. The relative humidity of the air stream slightly increases from about 10% to about 30% as also shown in FIG. 4. This is now an almost purely sensible heat exchange process as the temperature of the inlet air stream changes. Then, the working air stream 304, which is taken from the supply air stream when its temperature is about 20° C. and its relative humidity is about 30% (see point I in FIG. 4), its humidified in the humidifier 302, so that its relative humidity increases to about 100%, as illustrated by curve 406 in FIG. 4. This process further cools the air stream, from about 20° C. to about 12° C. as shown in FIG. 4. Note that these numbers are exemplary and they would change depending on the size of the system and the temperature and humidity of the inlet air stream. As discussed above, the process illustrated by curve 406 takes place outside the wet channel 330, which is different from the conventional M-cycle systems.

Next, the humidified air stream 305 experiences, while traveling through the wet channel 330, the absorption of the sensible and latent heat for evaporating the water droplets, which is illustrated by curve 408 in FIG. 4. Curve 408 shows the that relative humidity of the air stream 305 remains practically unchanged as the water droplets transform into vapors and the temperature of this air stream increases from about 12° C. to about 20° C. Because the temperature of the working air stream 304 decreases from 20° C. to about 12° C. along curve 406, and then the temperature of the working air stream 305 is brought back to about 26° C. along curve 408, it can be said that the working air stream experiences both, latent and sensible heat exchange. In other words, the working air stream that is removed from the outlet air stream 308, cools down in the humidifier 302 (see curve 406) with a certain Δt, but that temperature is reversed (see curve 408) with substantially the same Δt so that overall, the working air stream that moves through the wet channel does not change its temperature in a significant way. In this way, the separation between the latent heat process and the sensitive heat process is achieved, which is responsible for the higher efficiency of the present system.

Figure 5:
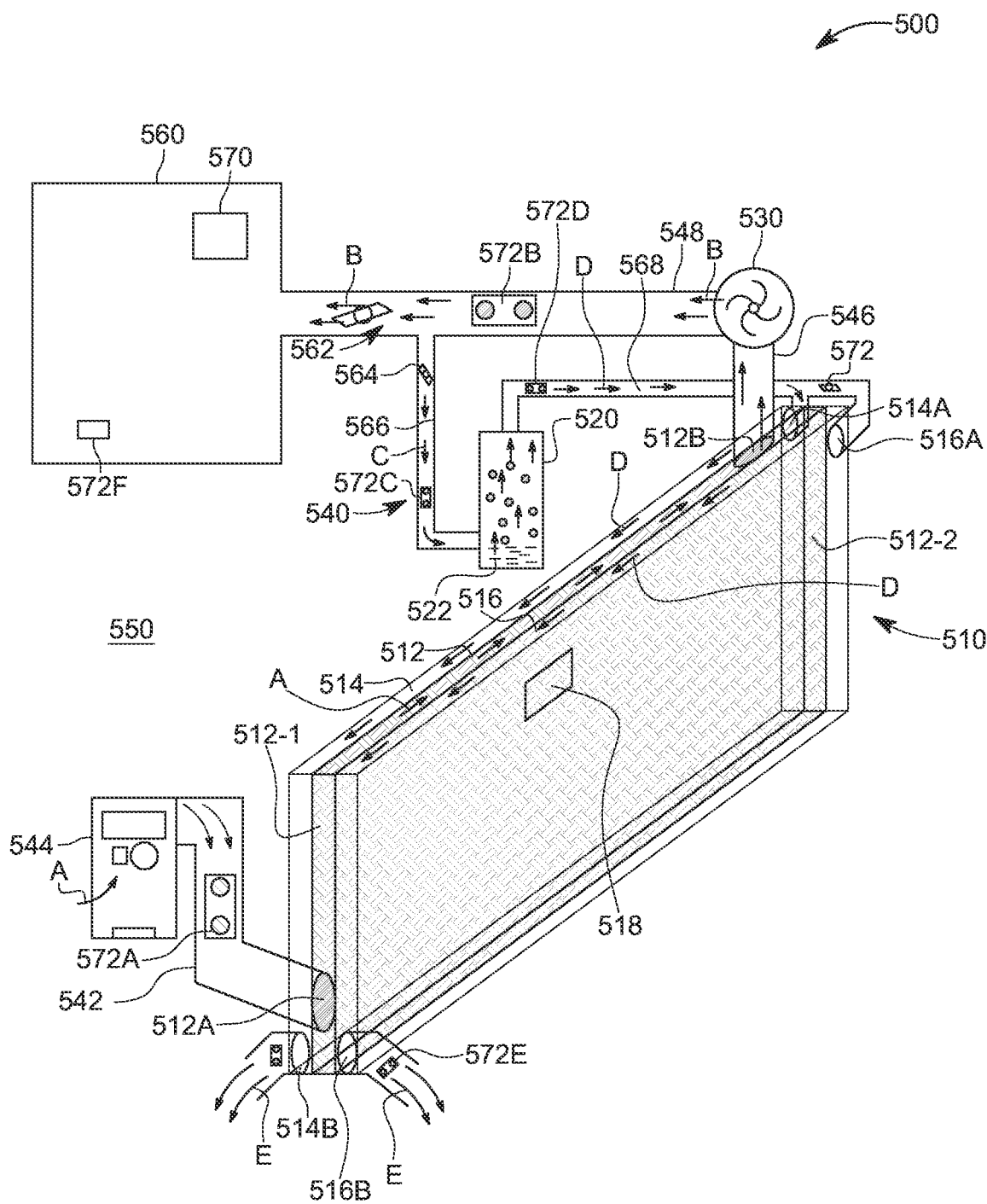
FIG. 5 shows one implementation of the combined direct evaporative-indirect evaporative cooling system.

While the DS-IEC system 300 in FIG. 3 is illustrated in a generic way for better explaining the processes that are taking place inside it, FIG. 5 shows an actual implementation of such a system. The DS-IEC system 500 has a heat exchange section 510, a humidifier 520, an air moving system 530, and a piping system 540.

The heat exchange section 510 includes, in this specific implementation, a single dry channel 512 and two wet channels 514 and 516. The dry channel 512 is directly sandwiched between the two wet channels 514 and 516. The separation between dry and wet channels may be made of a material that easily transfer heat, e.g., aluminum. The channels may be made to have a parallelepiped shape. In one application, the parallelepiped shape may be rectangular. Other shapes may be used. For a rectangular parallelepiped, in one application, the height is between 0.3 and 2 m, the length is between 0.5 and 3 m, and a thickness is between 0.5 and 30 cm. Other sizes may be used.

The dry and wet channels are made as empty boxes in this embodiment. However, to promote the evaporation of the water droplets inside the wet channels 514 and 516, one or more turbulent promoter devices 518 may be placed inside the wet channels. A turbulent promoter device may be an obstacle, for example, a partial wall, or a propeller or a passage that is not a straight line.

The dry channel 512 has an inlet 512A at one end 512-1 and an outlet 512B at an opposite end 512-2. The inlet 512A is connected to an inlet conduit 542, which communicates with an ambient 550 of an enclosure 560 to be cooled. The enclosure 560 may be a room in a house, school, office building, warehouse, etc. while the ambient 550 is the outside atmosphere. Optionally, a dehumidifier 544 may be connected to the inlet conduit 542 to remove some of the humidity of the inlet air stream A that is pulled inside the dry channel 512. For example, the ideal conditions may be that the inlet air stream A has a humidity of about 10%, as it is found in a dry and hot area of the earth. If this is the case, the dehumidifier 544 is not necessary. However, if the system is placed in a humid area, for example, air humidity is about 50%, than the dehumidifier 544 is used to bring the humidity of the inlet air stream A to the desired low humidity of about 10%. The above noted numbers are provided for understanding various features of this embodiment, but one skilled in the art would understand that the embodiments discussed herein would work for other values. A controller 570, located either inside the enclosure 560, or next to the system 500, is connected to one or more sensors 572A, located inside the inlet conduit 542, and based on a reading of the humidity of the ambient 550, may turn on or off the dehumidifier 544 for the reasons discussed above. Note that if the humidity of the ambient air is low, e.g., below 20%, there is no need to have the dehumidifier 544 on.

The outlet 512B of the dry channel 512 is connected through a conduit 546 to the air moving system 530. The air moving system 530 may be a fan or a blower that absorbs the inlet air stream A, forces it through the dry channel 512, and then sends the cooled air stream B toward the enclosure 560, along piping 548. However, just before the cooled air stream B reaches the enclosure 560, a damper 562 is used to divert a portion of the air stream as working air stream C. The working air stream C is cold and dry. The amount of the working air stream C may be between 20 and 70% of the cooled air stream B. Controller 570 controls the damper 562 to adjust the percentage of air that is bleed as working air based on various temperature conditions inside the enclosure and the ambient. An additional damper 564 may be provided on the bleeding pipe 566, that connects the piping 548 to the humidifier 520. One or more sensor 572B and 572C may be placed in the piping 548 and 566, respectively, for measuring the temperature and/or humidity of the air inside. This data is provided to controller 570 for controlling the various parts of the system to maintain a temperature inside the enclosure 560.

Inside the humidifier 520, water 522 is sprayed or evaporates naturally so that water droplets are formed and moved by the working air stream C to generate a humid working air stream D. The water may be stored at the bottom of the humidifier or may be obtained from an outside source. It is desired that a relative humidity of the humid working air stream D is as high as possible. Another sensor 572D is placed in the working air piping 568 that connects the humidifier 520 to the wet channels 514 and 516, for measuring the temperature and/or humidity of the working air after passing the humidifier 520.

The working air piping 568 is connected to each of the wet channel 514 and 516 at corresponding inlets 514A and 516A. Another damper 572 may be located inside the working air piping 568 for controlling an amount of air entering each of the wet channel. This damper may also be controlled by controller 570. After the humid working air stream D enters inside the wet channels, the water droplets start to evaporate, thus, absorbing latent heat in the process. Heat from the inlet air stream A is transferred through the partition walls of the dry and wet channels 512, 514, and 516 so that the inlet air stream A cools down to become the cooled air stream B. After the humid working air stream D is passing the entire wet channel it has a high humidity, close to 100% RH, and a slight increase in temperature. This purged air stream E is then discarded at outlets 514B and 516B, into the ambient 550. This process repeats continuously as long as the air moving system 530 forces the various streams to circulate through the cooling system 500. Another sensor 572E may be placed in one or both outlets 514B and 516B for monitoring the temperature and/or humidity at this location. This information is also transmitted to controller 570.

Figure 6:
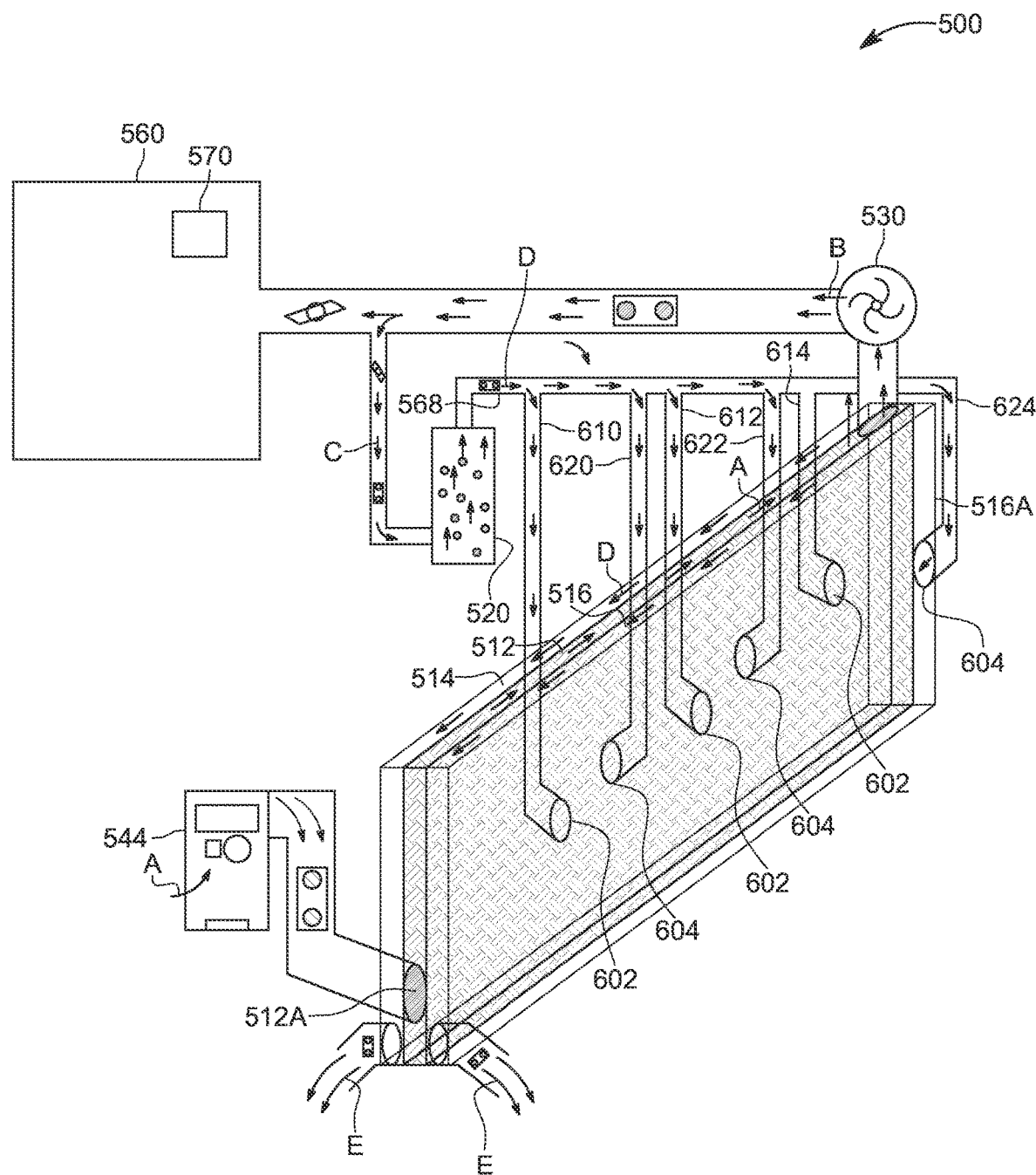
FIG. 6 shows another implementation of the combined direct evaporative-indirect evaporative cooling system.

According to another embodiment illustrated in FIG. 6, the cooling system 500 may be modified to have multi-point working air injection ports 602 and 604 into the wet channels to increase the effective utilization of the purged working air. FIG. 6 shows the piping 568 from the humidifier 520 being split into further piping (1) 610, 612, and 614 for providing the humidified air stream D to the multi-injection ports 602 to the wet channel 514, and (2) 620, 622, and 624 for providing the humidified air stream D to the multi-injection ports 604 of the wet channel 516. The injection ports 602 and 604 are located, in one application, at equal distances from each other, with the first port being located adjacent to the edge 516A of the wet channel 516 that is closest to the humidifier 520.

Note that by placing the humidifier 520 outside the wet channels and by humidifying the working air stream C outside the wet channels, the humid working air stream D increases the cooling potential of the system and the system is easier to manufacture, as discussed above with regard to FIG. 4. In addition, because the working air is injected at multi-points (ports) along the wet channels, as illustrated in FIG. 6, the working air is more effectively utilized. The number of the multi-points injection may be increased depending on the size of the wet channels.

Figure 7:
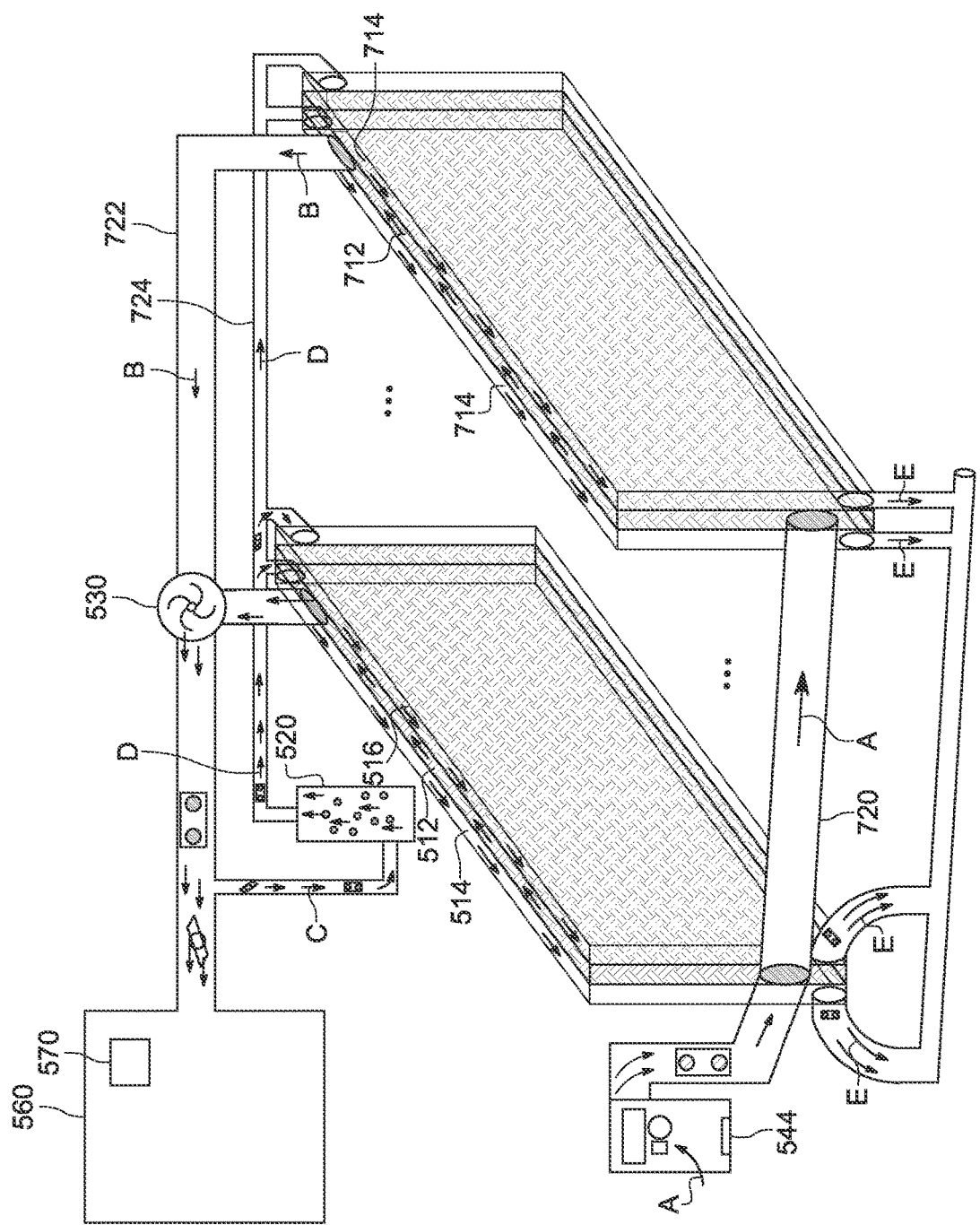
FIG. 7 illustrates a scaled up combined direct evaporative-indirect evaporative cooling system.

The system shown in FIGS. 5 and 6 may be scaled up if desired by adding more dry/wet channels as illustrated in FIG. 7. FIG. 7 shows a cooling system 700 having plural sets of dry channels (the first dry channel being 512 and the last dry channel being 712), each dry channel being sandwiched by two corresponding wet channels 514 and 516, and 714 and 716, respectively. The inlet air stream A is provided to the dry channel 712 by a pipe extension 720 that may be connected directly to the dehumidifier 544. The cooled air stream B from the dry channel 712 may be directed to the air moving system 530 through a pipe 722 and the humid working air stream D may be provided by a pipe 724 to the inlet of the wet channels 714 and 716, either directly from the humidifier 520 or from a second humidifier (not shown). One skilled in the art would understand that different variations of these connections may be implemented and more than two dry/wet channels sandwiches may be used to scale up the system.

The controller 570 mentioned above may be used to control the various dampers 562, 564, 572, but also to control a speed of the air moving system 530 and the power supply of the dehumidifier 544. For example, if a temperature inside the enclosure 560 is detected, by using for example, temperature sensor 572F, to be less than a target temperature, the controller 570 may close more the damper 562 to deviate more air into the working air stream C. In addition, the controller 570 may increase a speed of the air moving system 530 to increase a speed of the humid working air stream D and implicitly a speed of the inlet air stream A so that more heat is exchanged between the dry and wet channels.

The systems 300 and 500 discussed above share the following features. First, the humidification of the working air stream C takes place outside the dry and wet channels. Second, the dry channel is sandwiched between two or more wet channels. Third, the humid working air stream D is injected at multiple points into the wet channels. These features, although not necessary for a cooling system, improve the efficiency of such cooling system.

Figure 8:
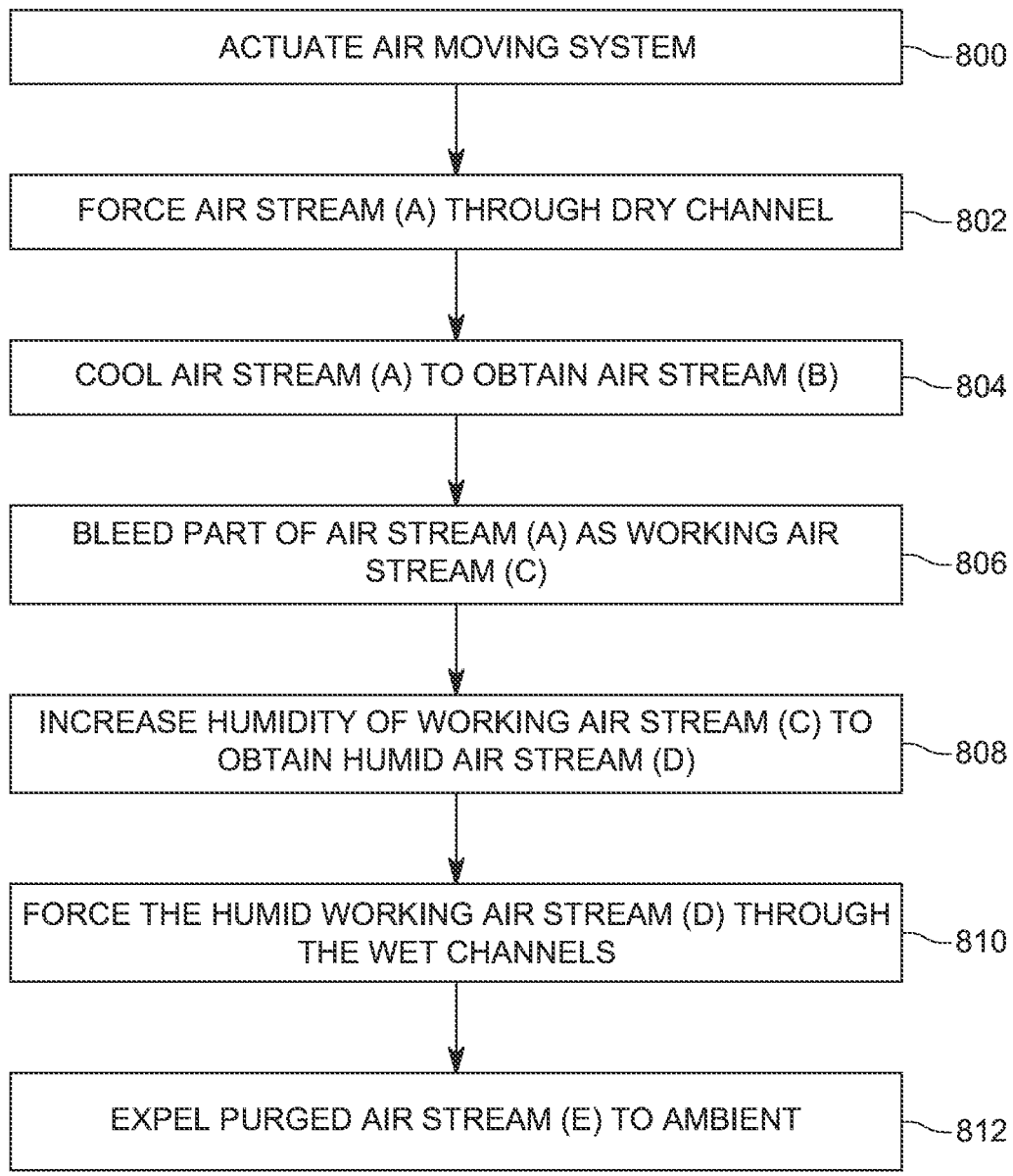
FIG. 8 is a flowchart of a method for cooling air with the combined direct evaporative-indirect evaporative cooling system.

A method for using a cooling system 500 as illustrated in FIG. 5 is now discussed with regard to FIG. 8. The method starts in step 800 by actuating the air moving system 530. In step 802, an outside air stream is drawn into the system as inlet air stream A. The inlet air stream A is directed through the dry channel 512, which is sandwiched between the wet channels 514 and 516. The system then cools in step 804 the inlet air stream A to become a cooled air stream B. Heat of the inlet air stream A is transferred from the dry channel to the wet channels. In step 806, the system bleeds part of the cooled air stream B as working air stream C and allows the remaining of the air stream B to enter inside an enclosure to cool the enclosure. In step 808, the working air stream C is passed through a humidifier to increase its relative humidity, so that the air stream becomes a humid working air stream D. In one application, the relative humidity of the working air stream C is increased to a range between 80 and 100%. In step 810, the humid working air stream D is forced to pass through the plural wet channels 514 and 516, to absorb heat from the inlet air stream A. In this way, the water droplets of the humid working air stream D change into water vapors. In step 812, the humid working air stream D has transformed into purged air stream E, which is expelled from the system, to the ambient of the enclosure that is being cooled.

With the configuration of the system 300 or 500, the above noted method separates the humidification of the working air stream C, which will provide simple and easy arrangement of the wet channels in a large system. Also, this arrangement will increase the cooling potential by water droplet evaporation when it gets in contact with the wall (e.g., aluminum foil) of the wet channel. The induced draft fan arrangement will help for better air flow in the wet channels, which will increase the evaporative potential of the air streams.

The systems discussed above eliminate the necessity of compressors, refrigerants, cooling towers, chilled and cooling water pipes, with a potential of saving more than 75% of the existing infrastructure of a cooling plant or chillers. In addition, the DS-IEC system 300 or 500 is expected to save the water consumption, up to 30% when compared with the conventional mechanically or thermally driven chillers, as the work input of compressors or generators has been eradicated. The proposed DS-IEC system is expected to save over 50% of the overall specific energy consumption as compared to conventional chillers.

The inventors have implemented the configuration shown in FIG. 5 with the following results. An experiment was performed at 43.15° C. inlet air temperature (measured with sensor 572A) with 20% RH and it was found that the supply air temperature (measured with sensor 572B) has dropped to 27° C. with same moisture contents. This configuration can achieve a temperature drop of up to 16-17° C. as compared to 7-10° C. in the conventional systems. For this experiment, the length of the channels was 1 m, the height of each of the three channels was 30 cm, and the width of each channel was 5 mm. The walls between the dry and wet channels were made of aluminum foil having a thickness of about 0.025 mm.

Figure 9:
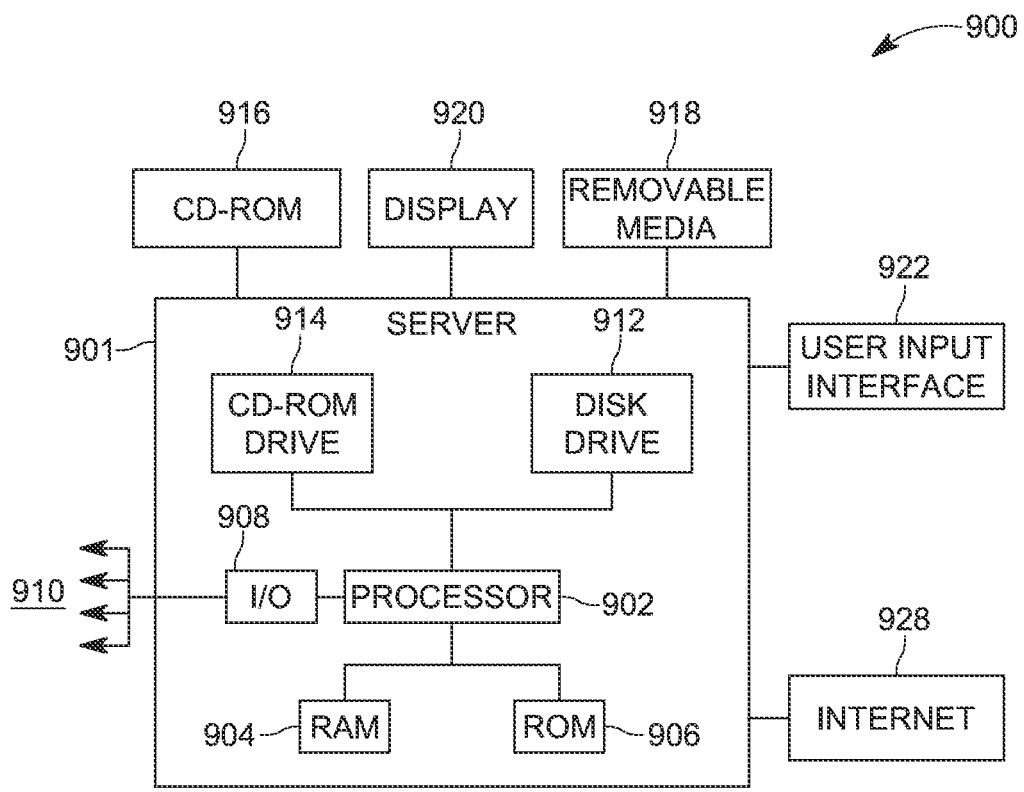
FIG. 9 illustrates a controller that controls the combined direct evaporative-indirect evaporative cooling system.

The controller 570 discussed with regard to the cooling system 500 may be implemented as a computing device as illustrated in FIG. 9. Hardware, firmware, software or a combination thereof may be used to perform the various steps and operations described herein.

Computing device 900 suitable for performing the activities described in the above embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration as in a global area network (GAN) such as the Internet 928, which allows ultimate connection to various landline and/or mobile computing devices.

The embodiments illustrated in the previous figures are suitable for cooling air from about 40° C. to about 27° C., depending on many environmental factors, for example, humidity and temperature of the ambient air. For many purposes, the final temperature of 27° C. is good enough. However, if this system is to be used for cooling an enclosure to be used as, for example, an office or a private residence, it is desired to obtain a final temperature closer to 21° C. then 27° C.

Figure 10:
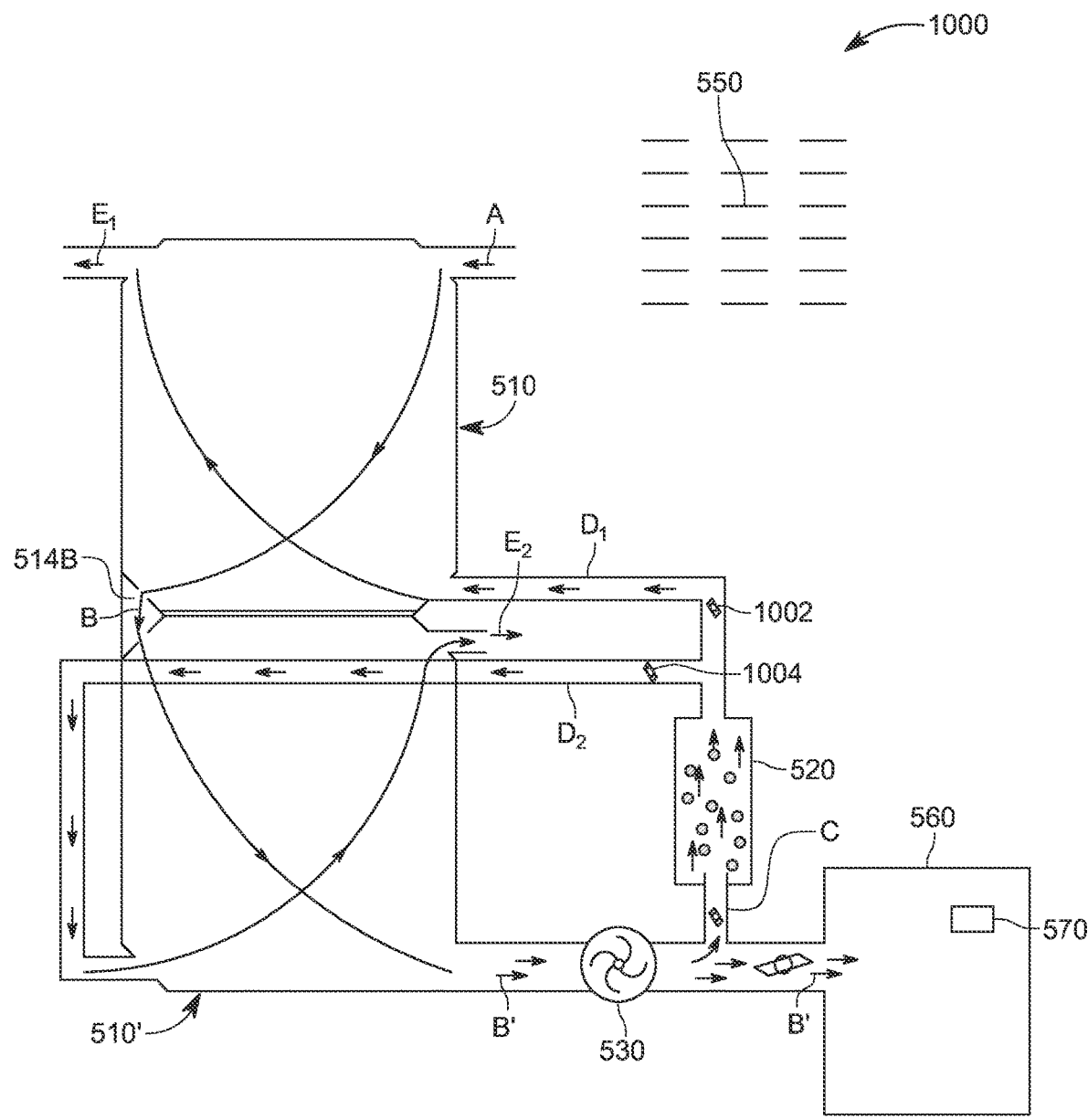
FIG. 10 illustrates a cooling system having two heat exchange sections and one humidifier.

Thus, for this specific application, as illustrated in FIG. 10, two heat exchange sections 510 and 510' (see an example of a heat exchange section in FIG. 5) can be fluidly connected to each other, to the air moving system 530, and to the humidifier 520 for further lowering the temperature of the cooled air stream. FIG. 10 shows the inlet air stream A being taken from the ambient 550, at about 40° C. The inlet air stream A is then introduced to the dry channel 512 (shown in FIG. 5, omitted in FIG. 10 for simplicity) and cooled to about 27° C. at the outlet 514B or 516B. The cooled air stream B is then passed to the dry channel (not shown) of the second heat exchange section 510' for being further cooled, to about 21° C., as the extra-cooled air stream B'. The extra-cooled air stream B' is then passed through the air moving system 530 (e.g., a blower powered by an electrical motor) and partially sent to the enclosure 560, which needs to be cooled. Part of the extra-cooled air stream B' is sent as the working air stream C to the humidifier 520, to increase its humidity to about 100% RH. The term "about" is used in this application to mean within a range of +/−10 of a given value. Two humid working air streams D1 and D2 are then generated by using dampers 1002 and 1004, which are located in the piping that connects the humidifier 520 to the heat exchange sections 510 and 510'. The humid working air streams D1 and D2 enter their corresponding wet channels (not shown) in their corresponding heat exchange sections 510 and 510', and transfer heat from the corresponding dry channels, cooling down the inlet air stream A. The resulting purged air streams E1 and E2 are then discharged in the ambient as explained in the embodiment illustrated in FIG. 5.

The embodiment illustrated in FIG. 10 uses two or more similar heat exchange sections 510, connected in series, for successively cooling the inlet air stream A. One skilled in the art would understand that more heat exchange sections 510 may be used if the final temperature of the cooled air stream to be supplied to the enclosure is desired to be lower. The two or more heat exchange sections 510 may be positioned one in top of the other as illustrated in FIG. 10, so that the inlet air stream A naturally moves down into the next heat exchange section 510', as the inlet air stream A is being cooled. However, the two or more sections 510 may be located side to side, i.e., at the same height relative to the earth's surface as the air moving system 530 moves the various air streams throughout the system.

Figure 11:
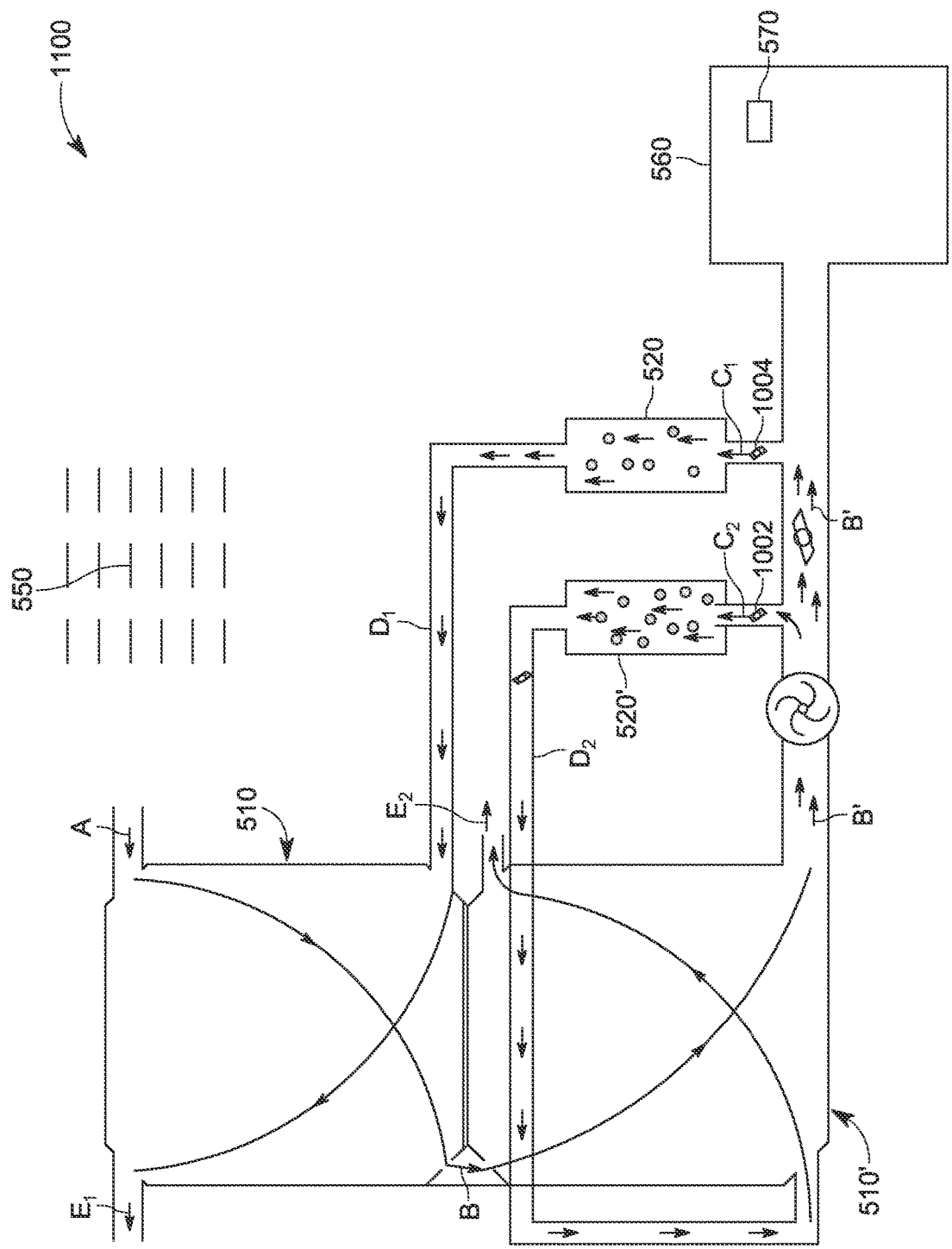
FIG. 11 illustrates a cooling system having two heat exchange sections and two humidifiers.

In FIG. 11, a variation of the cooling system 1000 is shown. The cooling system 1100 has different humidifiers 520 and 520' for each working air stream C1 and C2 so that a humidity of the humid working air streams D1 and D2 are independently controlled by controller 570. Except for this difference, the cooling system 1100 is identical to the cooling system 1000.

Figure 12:
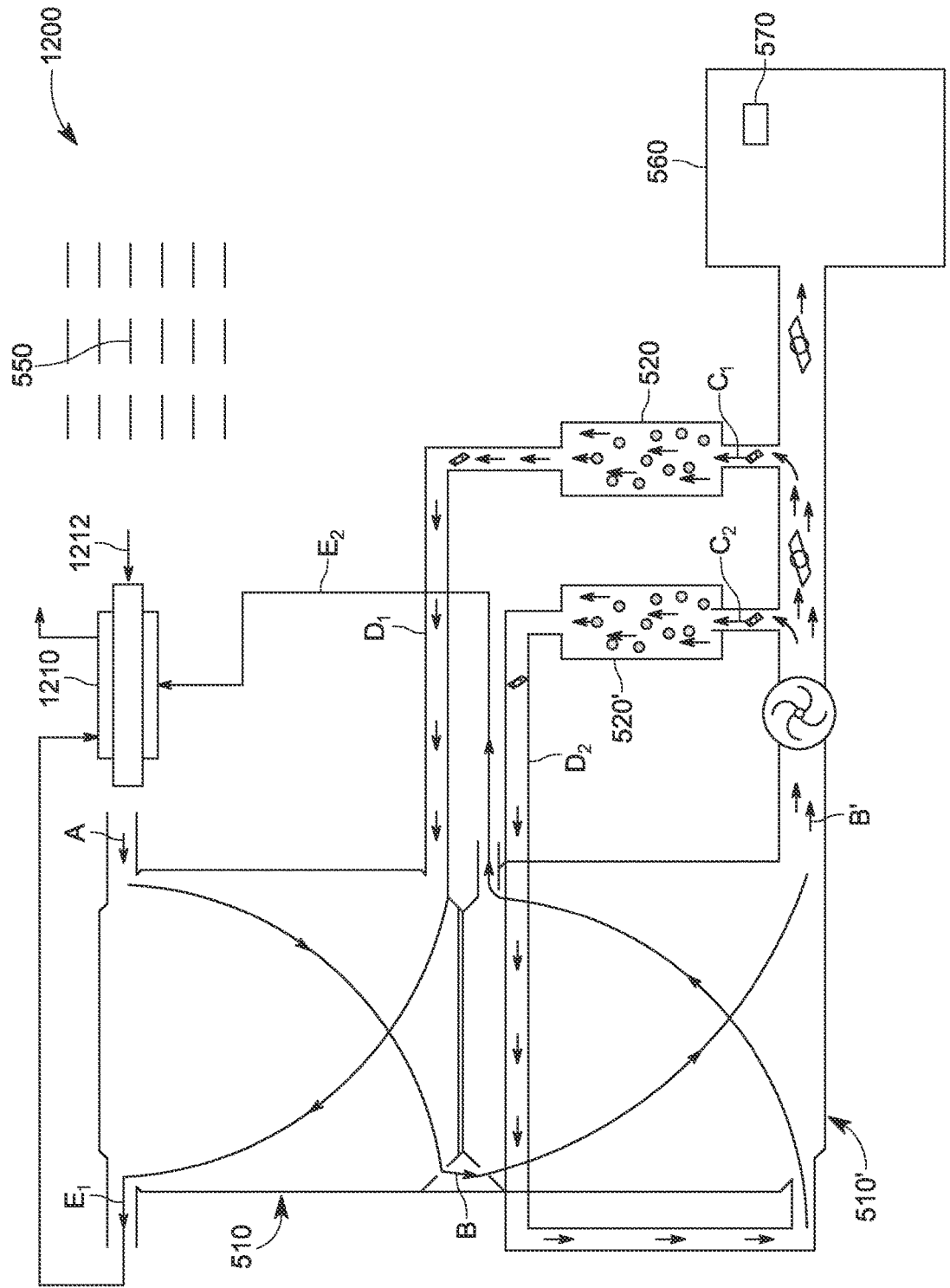
FIG. 12 illustrates a cooling system having an outdoor air pre-cooler for the inlet air stream.

FIG. 12 illustrates another cooling system 1200 that is similar to the cooling system 1100, except that a heat exchange unit 1210 (or pre-cooler) is used for cooling an ambient air stream 1212 from the ambient 550, prior to being fed as the inlet air stream A to the heat exchange section 510. If two heat exchange sections 510 and 510' are used as illustrated in FIG. 12, the purged air streams E1 and E2 from both heat exchange units are directed into the heat exchange unit 1210 to cool the ambient air stream 1212 as the purged air streams E1 and E2 have a lower temperature than the air from the ambient 550. This step further increases the efficiency of the cooling system 1200.

While the above embodiments referred to an enclosure 560 that is desired to be cooled, it is possible that the enclosure is part of an additional air conditioning system. For example, the enclosure 560 may be a component of a traditional electrical air conditioning and the cooling system 500 is used to pre-cool the air to be used by the traditional air conditioning system. The enclosure 560 may be used for other purposes than what was described above.

The disclosed embodiments provide methods and systems for cooling an enclosure without the use of compressors, refrigerants, cooling towers, chilled and cooling water pipes. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cooling system for cooling an enclosure, the cooling system comprising:
   a heat exchange section configured to transfer sensible heat between an inlet air stream and a humid working air stream;
   a humidifier located outside the heat exchange section and configured to humidify a working air stream, extracted from the inlet air stream, to generate the humid working air stream so that the humidifier transfers latent heat;
   an air moving system configured to move various air streams through the cooling system; and
   a piping system configured to provide the humid working air stream from the humidifier to the heat exchange section, and the working air stream to the humidifier,
   wherein the sensible heat transfer between the inlet air stream and the humid working air stream is decoupled from the latent heat transfer at the working air stream.

2. The cooling system of claim 1, wherein the heat exchange section comprises:
   a dry channel; and
   first and second wet channels and,
   wherein the dry channel is directly sandwiched between the first and second wet channels.

3. The cooling system of claim 2, wherein the dry channel has an inlet for receiving the inlet air stream, the inlet air stream A being air received from outside the enclosure that is being cooled by the cooling system.

4. The cooling system of claim 3, further comprising:
   a dehumidifier connected to the inlet of the dry channel for removing humidity from the inlet air stream.

5. The cooling system of claim 3, wherein the dry channel has an outlet fluidly connected to the air moving system.

6. The cooling system of claim 5, wherein a cooled air stream exiting the outlet of the dry channel, is partially deviated as a working air stream toward the humidifier, and the remaining of the cooled air stream is released into the enclosure to be cooled.

7. The cooling system of claim 6, wherein the working air stream is humidified inside the humidifier and transformed into the humid working air stream.

8. The cooling system of claim 7, wherein a relative humidity of the humid working air stream is higher than 90%.

9. The cooling system of claim 7, wherein the humid working air stream is input to the first and second wet channels.

10. The cooling system of claim 7, wherein the humid working air stream is input at multiple injection ports for each of the first and second wet channels.

11. The cooling system of claim 9, wherein the humid working air stream experiences evaporation within the first and second wet channels, resulting in a purged air stream.

12. The cooling system of claim 11, wherein the purged air stream is released into the ambient at outlet ports of the first and second wet channels.

13. The cooling system of claim 1, further comprising:
    a controller located inside the enclosure to be cooled; and
    a damper located in the piping system for deviating a part of a cooled air stream from the heat exchange section to the humidifier,
    wherein the controller controls a flow of the deviated cooled air stream by adjusting a position of the damper.

14. The cooling system of claim 13, further comprising:
    plural temperature and humidity sensors located throughout the piping system for providing information to the controller for adjusting a speed of the air moving system and a position of the damper.

15. The cooling system of claim 1, further comprising:
another heat exchange section configured to transfer heat, wherein a cooled air stream from the heat exchange section is used as input by the another heat exchange section.

16. A method for cooling an enclosure with a cooling system, the method comprising:
absorbing from outside the cooling system an inlet air stream and circulating the inlet air stream through a dry channel of a heat exchange section, which is configured to transfer sensible heat from the dry channel to first and second wet channels;
cooling the inlet air stream in the dry channel to obtain a cooled air stream;
removing part of the cooled air stream as a working air stream;
increasing a humidity of the working air stream with a humidifier, which is located outside the heat exchange section, to obtain a humid working air stream;
circulating the humid working air stream through the first and second wet channels to evaporate water droplets and obtain a purged air stream; and
expelling the purged air stream outside the cooling system.

17. The method of claim 16, wherein the dry channel is directly sandwiched between the first and second wet channels.

18. The method of claim 16, further comprising:
dehumidifying with a dehumidifier the inlet air stream prior to entering the dry channel.

19. The method of claim 16, further comprising:
releasing the remaining cooled air stream into the enclosure to be cooled.

20. The method of claim 16, further comprising:
increasing a humidity of the working air stream so that a relative humidity of the humid working air stream is larger than 90%.

21. The method of claim 16, further comprising:
inputting the humid working air stream at multiple injection ports located along each of the first and second wet channels.

22. The method of claim 16, further comprising:
decoupling the sensible heat exchange from the latent heat exchange by performing the sensible heat exchange in the dry channel and by performing the latent heat exchange in the humidifier.

23. The method of claim 16, further comprising:
adjusting, with a controller, a position of a damper, which is located in a piping system (540), to control a flow of the working air stream.

24. The method of claim 16, further comprising:
measuring plural temperature and humidity values throughout the cooling system for adjusting a speed of the air moving system and a position of a damper.

25. A cooling system for cooling an enclosure, the cooling system comprising:
a dry channel configured to perform sensible heat exchange on an inlet air stream to obtain a cooled air stream for cooling the enclosure;
a first wet channel configured to transfer heat to a humid working air stream to obtain a purged air stream; and
a humidifier located outside the dry channel and the first wet channel and configured to humidify a working air stream to obtain the humid working air stream,
wherein the inlet air stream is taken from outside the enclosure, and
wherein the purged air stream is released outside the enclosure.

26. The cooling system of claim 25, further comprising:
a second wet channel,
wherein the dry channel is directly sandwiched between the first and second wet channels.

27. The cooling system of claim 26, further comprising:
an air moving system configured to move the inlet air stream, the cooled air stream, the working air stream, the humid working air stream, and the purged air stream through the cooling system; and
a piping system configured to connect the dry channel, the first and second wet channels to the humidifier and to the air moving system.

* * * * *